3 Sheets—Sheet 1.

W. SAWYER,

Assignor to THE EASTERN ELECTRIC MANUFACTURING CO.

DYNAMO ELECTRIC MACHINE.

No. 9,836. Reissued Aug. 9, 1881.

Witnesses
E. Johnston
Chas. E. McGill, Jr.

Inventor
William Sawyer
By J. H. MacDonald
Atty

3 Sheets—Sheet 2.

W. SAWYER,

Assignor to THE EASTERN ELECTRIC MANUFACTURING CO.

DYNAMO ELECTRIC MACHINE.

No. 9,836. Reissued Aug. 9, 1881.

Witnesses

W. J. Johnston

Chas. C. McGill, Jr.

Inventor

William Sawyer

By J. N. MacDonald

Att'y

3 Sheets—Sheet 3.

W. SAWYER,

Assignor to THE EASTERN ELECTRIC MANUFACTURING CO.

DYNAMO ELECTRIC MACHINE.

No. 9,836. Reissued Aug. 9, 1881.

Witnesses
W. J. Johnston
Geo. C. McGill, Jr.

Inventor
William Sawyer
By J. H. MacDonald
Att'y

UNITED STATES PATENT OFFICE.

WILLIAM SAWYER, OF NEW YORK, N. Y., ASSIGNOR TO THE EASTERN ELECTRIC MANUFACTURING COMPANY, OF MIDDLETOWN, CONN.

DYNAMO-ELECTRIC MACHINE.

SPECIFICATION forming part of Reissued Letters Patent No. 9,836, dated August 9, 1881.

Original No. 227,845, dated May 18, 1880. Application for reissue filed April 26, 1881.

*To all whom it may concern:*

Be it known that I, WILLIAM SAWYER, of New York, in the county of New York and State of New York, have invented certain new and useful Improvements in Dynamo-Electric Machines; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to dynamo-electric machines; and it consists, first, in a hollow armature-shaft, the openings through which terminate at each end of the armature and open into a water-chamber at the armature ends; second, in an armature-shaft hollowed through its center to the opposite ends of the armature, and provided with end openings for the ingress and egress of the water, and middle openings for the passage of the water into and out of water-chambers at each end of the armature; third, in a dynamo-electric machine in which the water for cooling the armature flows into chambers at the armature ends and thence through openings around the armature; fourth, in the water-chambers at each end of the armature, formed by a water-tight cap attached to the ends of the armature, and provided with a collar surrounding the armature-shaft; and, lastly, in details of construction that will be hereinafter more fully set forth in the specification and pointed out in the accompanying drawings, in which—

Figure 1:
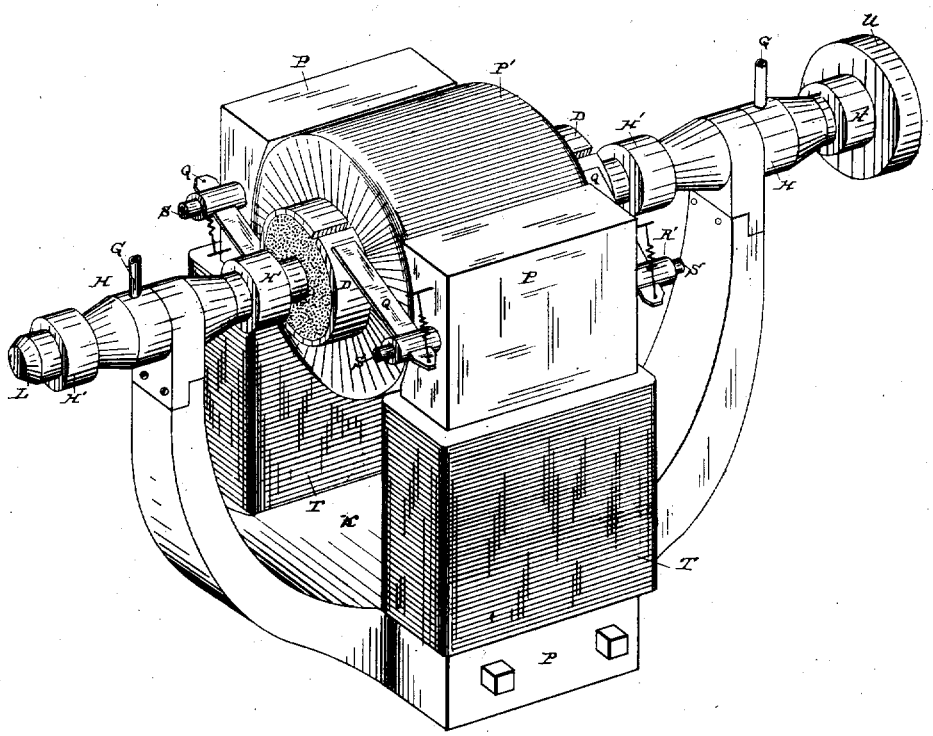
Figure 2:
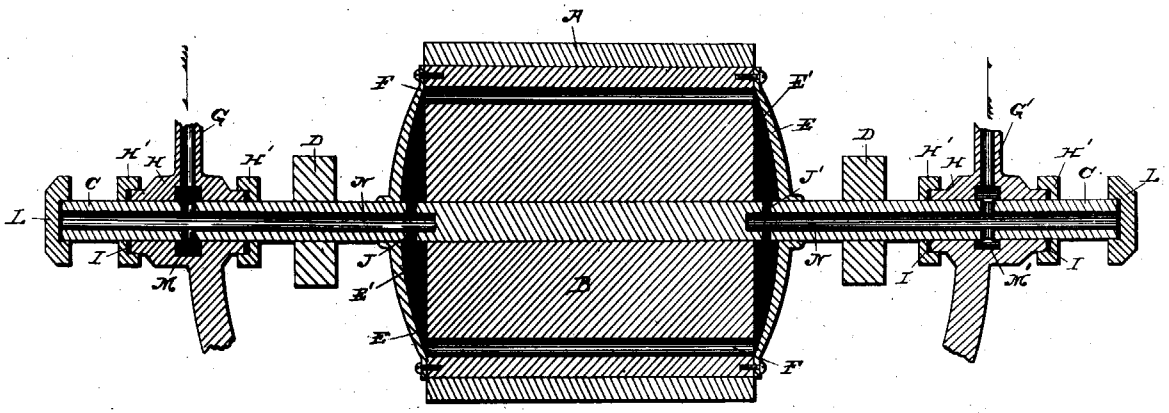
Figure 3:
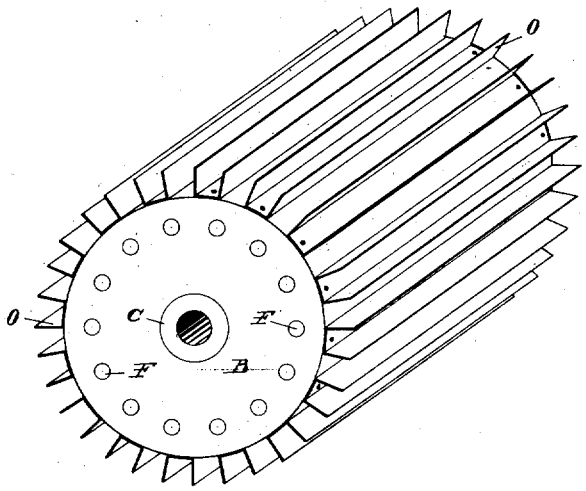
Figure 4:
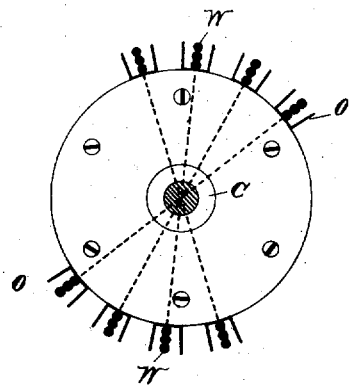

Figure 1 is a perspective view of the machine; Fig. 2, a section of the same, and Figs. 3 and 4 are sections of the heat-conducting pieces.

Like letters of reference indicate like parts in the several figures.

Dynamo-electric machines and their operation are so well understood at the present day that it is deemed superfluous to enter into a minute description of the same. The great difficulty with all such generators of electricity is their liability to heat, and thereby to greatly increase their resistance, if not to burn the insulating material in which the wires are incased.

The principal object of my invention is to prevent this electrical heating.

Referring more particularly to the drawings, P P are the two limbs of an electro-magnet bolted to the back piece, K, and P′ is the wire-wound armature.

The drawings are intended to represent what is known as the "new Siemens machine," in so far as the magnet and its armature are concerned, D D being the rotating insulated commutators, and Q Q the brushes on studs S, held to their bearings by springs R, from which the current is taken, T being the magnet-coils.

I have not deemed it necessary to show the method of electrically connecting up the machine, for the reason that I do not confine my invention to the Siemens or any particular machine; and my invention, being applicable to any machine, has no specific relation to this one, and does not consist in any particular part of any dynamo-machine electrically considered.

The shaft C, working in the bearings H in the offsets from the magnet back piece, K, is caused to rotate by a belt (not shown) passing over pulley U, as will be comprehended without further description.

In other dynamo-machines cooling of the parts has been attempted mainly either by running water through the shaft or by rotating the armature in water. The latter method is for several readily appreciated reasons objectionable, and in the former the non-conducting material incasing the wires being an equally good non-conductor of heat, the efficiency of the device is questionable. Radiation by means of great exposure of surface has also been attempted; but this, too, has its objections, principally on account of the increased power required to drive the machine.

Through the armature B, Fig. 2, I pass a shaft, C, hollowed, as shown, so that the part passing directly through the armature from end to end is solid. At the armature ends the shaft has two ports, J J′, entering into water-chambers E′, formed by attaching a water-tight cap, E, to the ends of the armature, and having its central part forming a collar to pass around the shaft C. This cap E is made water-tight by any of the well-known devices for that purpose. The armature is perforated throughout its length by holes F, entering into the water-chamber E′, just described. An opening, G, admits water, which is carried to the shaft C through the annular space M, and flows along the hollowed space N to the ports J, where it flows into the chamber E, and, traversing the perforations F, is conveyed around the armature and discharged into the opposite chamber, and leaves said chamber by way of the ports J′, and again reaches the hollow shaft upon the opposite side of the armature, and is conducted off through the annular space M′ and exit-tube G′. To close the ends of the shaft I employ screw-caps L. To make the water-joints of the journal-bearings tight I employ the screw-caps H′, packed with cotton waste or other like material, I. The result of the constant passage of water through the perforations F is to cool the armature, (and I remark that I may cool the magnet P in the same manner,) and thereby to prevent undue heating; but as, owing to the non-conducting character of the insulating covering of the wire with which the armature is wound, the outer layers (shown in Fig. 4) would not be cooled by the water passing through the armature, I have resorted to the device shown in Figs. 3 and 4, the same being U-shaped pieces of copper or other metal, O, screwed or pinned to, or in any other manner held to the armature B, in the spaces of which are wound the wires W. Being a good conductor, these U-shaped pieces rapidly convey the heat generated in all the layers of the wire to the armature, whence it is carried off by the flowing water. I do not, however, in this application claim the heat-conducting pieces O, as that feature of the invention is to be made the subject of a separate patent.

Having thus fully described my invention, what I claim as such, and desire to secure by Letters Patent, is—

1. In a dynamo-electric machine, a hollowed armature-shaft, the openings through which terminate at each end of the armature and open into a water-chamber at the armature ends, substantially as described.

2. A dynamo-electric machine provided with water-tight chambers at each end of a perforated armature, as described, and a hollow armature-shaft having inlet and outlet ports, so that the water for cooling the armature may traverse the armature-shaft to a water-chamber at one end of the armature, thence through the armature-perforations to a water-chamber and exit-tube at the opposite end of said armature, substantially as and for the purpose set forth.

3. A dynamo-machine having a water-chamber at each end of the armature, formed by a water-tight cap attached to the armature ends, and having a collar surrounding the armature-shaft, substantially as described.

4. A dynamo-electric machine having water-chambers at each end of the armature, and a hollow armature-shaft provided with openings near its outer ends for the ingress and egress of the water, and ports near its center for the passage of the water to and from said water-chambers, substantially as described, and for the purpose set forth.

5. A dynamo-electric machine having an armature provided with a circular series of longitudinal perforations passing entirely through the armature near its outer surface, whereby a running stream of water may pass through said perforations and around the body of the armature, substantially as and for the purpose set forth.

6. In a dynamo-electric machine, the combination of an armature having perforations for the passage of a stream of water, with water-tight caps E, substantially as and for the purpose set forth.

7. In a dynamo-electric machine, the combination of an armature, B, a hollow shaft provided with an opening at one end of said armature and another opening at the other end of said armature, with two or more openings, F, through said armature, substantially as shown and described.

8. A dynamo electric machine provided with caps at each end of the armature, forming water-chambers, said water-chambers expanding to a greater size at the points or ends of the armature than the size of the ingress and egress openings, substantially as shown and described.

9. A dynamo-electric machine having a hollow armature-shaft with inlet and outlet ports, and a perforated armature, the perforations opening into water-chambers of greater size than said perforations, substantially as shown and described.

In testimony whereof I affix my signature in presence of two witnesses.

WM. SAWYER.

Witnesses:
F. W. HANAFORD,
WORTH OSGOOD.